United States Patent
Fauber

[15] 3,650,791
[45] Mar. 21, 1972

[54] PAVING OR BINDER COMPOSITIONS CONTAINING ASPHALT REACTED WITH DIISOCYANATE

[72] Inventor: Eugene M. Fauber, Hammond, Ind.

[73] Assignee: Sinclair Research, Inc., New York, N.Y.

[22] Filed: Apr. 13, 1967

[21] Appl. No.: 630,512

[52] U.S. Cl..................................106/279, 94/20, 106/280, 106/285, 208/22, 208/44, 260/28.5
[51] Int. Cl...................C08h 13/00, C08h 17/22, C08j 1/46
[58] Field of Search.................................106/273–284, 123, 106/123 TD; 208/22, 44; 260/28, 285 AS, 77.5 A, 77.5 AM, 77.5 CH, 858, 859, 77.5 CR

[56] References Cited

UNITED STATES PATENTS

| | | | |
|---|---|---|---|
| 3,084,182 | 4/1963 | McElroy | 106/273 X N |
| 3,092,594 | 6/1963 | Heiss | 260/28 X |
| 3,179,610 | 4/1965 | Wood | 260/28 |
| 3,182,032 | 5/1965 | Charlton et al. | 106/273 X N |
| 3,358,052 | 12/1967 | Archer, Jr. et al. | 260/28 X |
| 3,427,366 | 2/1969 | Verdol et al. | 260/77.5 CR |

Primary Examiner—Joan B. Evans
Attorney—McLean and Morton

[57] ABSTRACT

Compositions suitable for use as paving or as a binder for paving materials and possessing improved ductility, viscosity and resistance to oxidation are obtained by reacting a minor amount of a diisocyanate with asphalt. The preferred diisocyanate is toluene diisocyanate. This composition may be blended with urethane in situ or the urethane-forming components, e.g., polyhydroxy-terminated polydiene and hydrocarbon diisocyanate may be added separately. Blending the asphalt-diisocyanate composition with urethane-forming materials has been found to improve viscosity and homogeneity and decrease the amount of carbon tetrachloride insolubles.

6 Claims, No Drawings

PAVING OR BINDER COMPOSITIONS CONTAINING ASPHALT REACTED WITH DIISOCYANATE

This invention relates to novel compositions obtained by reacting asphalt with diisocyanates. These asphalt compositions may be used as such or may be blended with, for instance, urethanes or urethane-forming components such as hydroxy-terminated polydienes and additional diisocyanates. These asphalt materials may be used in coating and crack-filling applications or may be mixed with other materials, e.g., granular, inorganic, often siliceous, solids. The asphalt materials may also be used as paving or as a binder for suitable paving aggregate.

It is considered desirable that asphalts used in paving roads have three test properties: high ductility at low temperature, high viscosity at high temperature, and good resistance to oxidation. High ductility at low temperature is important to prevent cracking of the pavement during cold weather. High viscosity on the other hand, is of significant importance during hot summer weather in order to provide stability to the road surface. Oxidation of asphalt produces surface hardening which decreases the durability of roads made with the asphalt.

In accordance with the present invention, it has been found that normally solid, including semi-solid asphalts which have been reacted with a small amount of diisocyanate possess improved properties of ductility, viscosity and resistance to oxidation. The particular asphalt used may depend largely on the properties desired in the final product and the asphalts may be cut back with other hydrocarbon oils. For example, if low temperature ductility is desired, asphalts having a penetration of up to about 80 are advantageously employed, though it is to be understood that good low temperature ductility may also be obtained when the penetration of the asphalt exceeds 80. Particularly good viscosity at 140° F. is found when asphalts of about 20 to 300 or greater penetration are used.

The isocyanate employed to produce the asphalt compositions of this invention may be any one or more of a number of materials containing essentially two isocyanate radicals although a minor portion of the material may have more than two isocyanate radicals. The usable agents for making the composition of this invention include the various organic or hydrocarbon diisocyanates such as the aliphatic, including cycloaliphatic, and aromatic diisocyanates. Preferably the diisocyanates have about six to 18 carbon atoms. Examples of these materials are tolylene diisocyanates (TDI), 4,4'-diphenylmethane diisocyanate, 1,5-naphthalene diisocyanate, phenylene diisocyanates, trans-vinylene diisocyanate, 3,3'-dimethoxy-4,4'-biphenyl diisocyanate, as well as related aromatic and aliphatic diisocyanates, which may also be substituted with other organic or inorganic groups.

Mixing or blending of the asphalt and the diisocyanate is conveniently carried out by first heating the asphalt to a liquid state, e.g., to a temperature of from at least about 200° F. to just below the temperature at which the diisocyanate decomposes preferably from about 225° to 350° F. The diisocyanate in liquid form can be blended into the fluid asphalt in an amount sufficient to produce the desired improvement in low temperature ductility and viscosity at 140° F. The actual amount of diisocyanate added will often be from about 0.05 to 2 weight percent or more, preferably from about 0.2 to 1 percent, based on the asphalt. Blending of the components may, for example be carried out in a propeller-type mixer in which the temperature is held at the desired level for the duration of the mixing, which may, for example, be about one-half hour.

Asphalt compositions prepared in the above or similar manner were found to have properties of high ductility at low temperature, high viscosity at high temperature and resistance to oxidation superior to those of asphalts not reacted with diisocyanates. Resistance to oxidation was determined largely by subjecting the samples to The Thin Film Oven Test (TFOT). This test simulates the conditions which asphalt will encounter in a hot mix plant pug mill and measures the change in properties of the asphalt due to this exposure. Accordingly an approximately ⅛-inch-thick film of asphaltic material is heated in an oven for 5 hours at 325° F. The change in penetration (as percent of the value before heating) is then determined.

Table I lists data derived from comparisons of untreated asphalts of two types, i.e., Mid-Continent and Wyoming, and also compares the two treated asphalts with two untreated asphalts having the same penetration. In both cases (Runs 2 and 5) 0.47 weight percent of tolylene diisocyanate (TDI) was reacted with the asphalt using the exemplary procedures described previously for mixing.

TABLE I

| | Runs | | | | | |
|---|---|---|---|---|---|---|
| | 1 | 2 | 3 | 4 | 5 | 6 |
| | Midcontinent asphalt A | Midcontinent asphalt A reacted with TDI | Midcontinent asphalt, same penetration as 2 by vacuum reduction | Wyoming asphalt B | Wyoming asphalt B reacted with TDI | Wyoming asphalt, same penetration as 5 by vacuum reduction |
| Specific gravity at 60° F. | 1.0168 | | | 1.0300 | | |
| Ductility at 39.2° F. | 1.3 | 9.0 | 1.1 | .4 | 1.5 | .3 |
| Ductility at 77° F. | 100+ | 100+ | 100+ | 100+ | 100+ | 100+ |
| Softening point (R&B), ° F. | 118 | 123 | 119 | 119 | 124 | 119 |
| Penetration at 77° F. | 63 | 55 | 55 | 51 | 51 | 50 |
| Penetration at 32° F. | 18 | 18 | 15 | 14 | 12 | 13 |
| Viscosity at 275° F., poises | 398 | 454 | 420 | 250 | 268 | 250 |
| Kin. at 140° F., C.P. | 2,196 | 2,586 | 2,312 | 1,453 | 1,870 | 1,460 |
| Sliding plate at 60° F., .05/sec., megapoises | 13 | 27 | 18 | 20 | 42 | 22 |
| TFOT, 5 hrs. at 325° F.: | | | | | | |
| Penetration at 77° F. after test | 39 | 40 | 35 | 32 | 37 | 32 |
| Percent penetration retained | 71 | 64 | 63 | 63 | 74 | 64 |

Comparing Column 1 with Column 4 in Table I shows the two base asphalts are quite different. The Mid-Continent A (Col. 1) possesses low specific gravity and high viscosity and the Wyoming B (Col. 4) possesses high specific gravity and low viscosity.

Comparing Column 1 with Column 2 and Column 4 with Column 5 shows that the reaction with TDI produces quite significant changes in properties. These changes are due to chemical reaction, because if the TDI simply diluted the asphalt, higher penetrations and lower viscosities would have resulted, whereas the opposite effect is clearly shown. Also this comparison shows the desirable effects of increased low temperature ductility, increased viscosity at 140° F. and improved Thin Film Oven Test (TFOT) results of increased percent retained penetrations.

Comparisons of Column 2 with Column 3 and Column 5 with Column 6 show the desirable improvements cannot be obtained by simply vacuum reducing the crude asphalt to the same penetration as that of the TDI reaction product.

It is of particular significance that Wyoming asphalt made by vacuum reduction when untreated with diisocyanate could not meet the Asphalt Institute's recommended viscosity specification for AC-24 paving asphalt, however, the product obtained by reacting the asphalt with 0.47 weight percent of toluene diisocyanate surpassed these requirements with ease as shown in Table II.

TABLE II

| Test | Asphalt Institute Range | Untreated Wyoming Asphalt | Reaction Product Asphalt With TDI |
|---|---|---|---|
| Vis. at 140° F., poises | 1800–3000 | 1460 | 1870 |
| Vis. at 275° F., centipoises | 200+ | 250 | 268 |
| Vis. at 60° F., 0.05/sec., Mega P. | 100– | 22 | 42 |

It has been found that the asphalt composition of this invention, in addition to having utility, for instance, as a paving material, also may subsequently be blended with urethane-forming compounds, e.g., poly-hydroxyl-containing polydiene polymers and additional diisocyanate, to form a composition having further enhanced viscosity, improved homogeneity and less carbon tetrachloride insolubles. The polyhydroxyl polydiene polymers include hydroxyl-terminated polybutadiene oils, having on the average about 2.1 to 2.6 predominantly primary, allylic, terminal hydroxyl groups per molecule. The polydiene and additional diisocyanate may be incorporated in small amounts, e.g., sufficient to give from about 0.5 to 6 percent urethane in the asphalt composition of this invention and in proportions to give an NCO/OH ratio between about 0.6 to 1.2. The diisocyanate can be of the types previously described herein.

Exemplary of the hydroxyl-containing polybutadiene copolymers and homopolymers which may be employed are the following: Polybutadiene No. 45, a polybutadiene homopolymer having a viscosity of 50 poises at 30° C., a hydroxyl content of 0.95 meq./g., a hydroxyl number (mg. KOH/g.) of 53, an average molecular weight of 2,200–2,500, about 2.1–2.2 terminal, allylic, hydroxyl groups which are predominantly primary, and an iodine number of 398, and which can be prepared by polymerizing 100 parts of butadiene in the presence of 70 parts of isopropanol and 10 parts of hydrogen peroxide in an aluminum clad autoclave at 118° C. for 2 hours; Polybutadiene No. 15, a homopolymer having a viscosity at 30° C. of 200 poises, a hydroxyl content of 0.80 meq./g., a hydroxyl number of 45 mg. KOH/g., an average molecular weight of 3,000–3,500, about 2.6 terminal allylic hydroxyl groups which are predominantly primary and an iodine number of 395, and which can be made by polymerizing 100 parts of butadiene in the presence of 35 parts of isopropanol and 6 parts of hydrogen peroxide for 2½ hours at 130° C.; Styrene copolymer No. 15 which has a molecular weight of about 2,200–2,500, a viscosity at 30° C. of 250 poises, a hydroxyl content (meq./g.) of 0.95, a hydroxyl number of 53 mg. KOH/g. about 2.5 terminal, allylic, hydroxyl groups which are predominantly primary, and an iodine number of 335, and which can be made by polymerizing 75 parts butadiene and 25 parts styrene in the presence of 70 parts isopropanol and 10 parts of 50 percent hydrogen peroxide for 2½ hours at 120° C.; Acrylonitrile copolymer No. 15, which has a viscosity of 550 poises at 30° C., a hydroxyl content of 0.80 meq./g., and hydroxyl number of 45 mg. KOH/g., an average molecular weight of 2,500–3,000, about 2.5 terminal, allylic hydroxyl groups, which are predominantly primary, and an iodine number of 345, and which can be made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 10 percent hydrogen peroxide.

Tests were made using a 50/60 penetration paving asphalt and a 60/70 penetration paving asphalt. Samples of the asphalts were first mixed with 0.25, 0.50, and 1.0 weight percent toluene diisocyanate at a temperature of 210°–250° F. This treated asphalt was stored at 275° F. for 7 days and then tested. After testing, hydroxy-terminated polybutadiene 45 (previously described) and additional toluene diisocyanate were added simultaneously at a temperature of 210°–250° F. and in proportion to and in amounts sufficient to provide an NCO/OH ratio of 1.0 and 3 weight percent of urethane. Also 0.35 weight percent based on the urethane of stannous octoate was added as a catalyst. After 7 days additional storage at 275° F., the blends were again tested. For comparative purposes 50/60 and 60/70 penetration asphalts were also prepared containing 3 weight percent of urethane alone. This was done by first adding hydroxyl-terminated polybutadiene oil 45 and heating to 210°–250° F. Stannous octoate catalyst (0.35 wt. %) based on urethane, and sufficient toluene diisocyanate to give an NCO/OH ratio of 1.0 were then added. After storage at 275° F. for 7 days, the blend was tested.

Tables III and IV compare the properties of the untreated asphalt, the asphalt containing only urethane, the asphalt treated with varying amounts of TDI and the asphalt treated with TDI to which urethane was added. Comparing the Kinetic Viscosities (KV) at 140° F., for example, it may be seen that in the case of the 50/60 penetration asphalt sample (Table III) almost a nine fold increase results and in the case of the 60/70 penetration sample (Table IV) almost a seven fold increase was found.

TABLE III

| | 50/60 penetration asphalt | | | | | | | |
|---|---|---|---|---|---|---|---|---|
| | Untreated asphalt | Asphalt containing 3% urethane | Percent TDI | | | 3% urethane forming components added after TDI pretreat percent | | |
| | | | 0.25 | 0.50 | 1.0 | 0.25 | 0.50 | 1.0 |
| Penetration at 77° F | 51 | 63 | 45 | 44 | 39 | 43 | 43 | 33 |
| Softening point (R&B)° F | 119 | 113 | 126 | 126 | 129 | 133 | 135 | 145 |
| Oliensis Spot, AO | + | + | + | + | + | + | – | + |
| After 24 hours | + | + | + | + | + | + | – | + |
| 10% Xylene, AO | – | – | + | + | + | – | – | – |
| After 24 hours | – | – | + | + | + | – | – | – |
| Ductility at 77° F | 100+ | 100+ | 100+ | 100+ | 100+ | 100+ | 100+ | 100+ |
| Ductility at 39.2° F | | | | | | | | |
| KV at 140 °F., C.P | 1,453 | 1,249 | 2,454 | 2,637 | 5,082 | 4,340 | 5,131 | 12,349 |
| Furol vis. at 275° F., sec | 125 | 117 | 150 | 136 | 537 | 204 | 228 | 406 |
| Specific gravity at 60° F | 1.0300 | 1.0336 | 1.0387 | 1.0392 | 1.0370 | 1.0345 | 1.0388 | 1.0356 |
| TFOT, wt. percent loss | .19 | .18 | .15 | 1.9 | .21 | .07 | .08 | .08 |
| Penetration after TFOT | 32 | 35 | 34 | 30 | 32 | 27 | 26 | 22 |
| Percent retained penetration | 63 | 56 | 76 | 68 | 82 | 63 | 61 | 67 |
| Insol. in CCl$_4$, wt. percent | .31 | .21 | .68 | .80 | 1.28 | .52 | .41 | .54 |

TABLE IV

| | Untreated asphalt | Asphalt containing 3% urethane | 60/70 penetration asphalt | | | 3% urethane forming components added after TDI pretreat percent | | |
|---|---|---|---|---|---|---|---|---|
| | | | Percent TDI | | | | | |
| | | | 0.25 | 0.50 | 1.0 | 0.25 | 0.50 | 1.0 |
| Penetration at 77° F | 69 | 79 | 52 | 53 | 46 | 50 | 57 | 44 |
| Softening point (R&B), °F | 120 | 115 | 124 | 124 | 128 | 130 | 131 | 140 |
| Oliensis Spot, AO | — | — | + | + | + | — | — | — |
| After 24 hours | — | — | + | + | + | — | — | — |
| 10% xylene, AO | — | — | + | — | + | — | — | — |
| After 24 hours | — | — | + | + | + | — | — | — |
| Ductility at 77° F | 100+ | 100+ | 100+ | 100+ | 100+ | 100+ | 100+ | 100+ |
| Ductility at 39.2° F | .5 | — | 5.7 | 5.5 | 5.6 | 5.2 | 6.6 | 4.9 |
| KV at 140° F., C.P. | 2131 | 1578 | 3500 | 3350 | 12940 | 5474 | 5209 | 14015 |
| Furol vis. at 275° F., sec | 191 | 238 | 226 | 225 | 304 | 338 | 356 | 622 |
| Specific gravity at 600° F | 1.0150 | 1.0211 | 1.0224 | 1.0150 | 1.0191 | 1.0203 | 1.0207 | 1.0231 |
| Loss, TFOT, wt., percent | .08 | .03 | [1].06 | [1].04 | [1].05 | [1].06 | [1] 0.6 | .05 |
| Penetration after TFOT | 39 | 49 | 36 | 34 | 33 | 34 | 34 | 28 |
| Percent Retained Penetration | 57 | 62 | 69 | 64 | 72 | 68 | 60 | 64 |
| Insol, in CCl₄, wt: percent | .2 | .64 | .51 | .39 | 1.29 | .51 | .31 | .56 |

[1] Gain.

The sequence of addition of the various components is important and different results are observed when the urethane components are added at the same time as the isocyanate used for pretreating the asphalt. Most significantly there is an increase in penetration and a decrease in viscosity over the results observed when the urethane components are added subsequent to the treatment with the diisocyanate alone. These results are tabulated in Table V.

TABLE V

50/60 Pen. Asphalt

| | Treated with 0.25% TDI prior to 3% Urethane Addition | 3% Urethene Addition Plus 0.25% TDI Added in One Step |
|---|---|---|
| Pen. at 77° F. | 43 | 55 |
| Softening Pt. (R&B), °F. | 133 | 123 |
| KV is at 140° F., C.P. | 4340 | 1074 |
| Furol vis. at 275° F., sec. | 204 | 155 |

Rather than adding the urethane components separately, subsequent to the diisocyanate pretreatment, it is also contemplated that premixed urethane-forming components may be added so long as the resulting polymer has not cured to the point where it is no longer compatible with the asphalt; however, the blend obtained by mixing the components in this sequence will not necessarily have the same properties as those found when forming the urethane in the presence of the diisocyanate-treated asphalt.

It is claimed:

1. A composition consisting essentially of the reaction product of asphalt and a small amount of about 0.05 to 2 percent by weight based on the asphalt of a hydrocarbon diisocyanate having about six to 18 carbon atoms, said amount being sufficient to produce improved properties of at least one of viscosity, ductility, and resistance to oxidation of the asphalt, having added thereto subsequent to the reaction of the hydrocarbon diisocyanate with the asphalt, small amounts of a hydrocarbon diisocyanate of about 6 to 18 carbon atoms and a hydroxyl-terminated polybutadiene oil having about 2.1 to 2.6 predominantly primary, allylic, terminal hydroxyl groups per molecule, said subsequently added hydrocarbon diisocyanate and hydroxyl-terminated polybutadiene oil being sufficient to produce about 0.5 to 6 percent urethane.

2. The composition of claim 1 in which the amount of diisocyanate is from about 0.2 to 1 percent by weight.

3. The composition of claim 2 in which the diisocyanate is toluene diisocyanate.

4. The composition of claim 1 in which the ratio of NCO to OH in the subsequently added diisocyanate and hydroxyl-terminated polybutadiene oil is between about 0.6 and 1.2.

5. The composition of claim 4 in which the diisocyanate of toluene diisocyanate.

6. The composition of claim 1 in which the diisocyanate is toluene diisocyanate.

* * * * *